USOO5550751A

United States Patent [19]
Russell

[11] Patent Number: 5,550,751
[45] Date of Patent: Aug. 27, 1996

[54] EXPERT SYSTEM FOR DETECTING HIGH IMPEDANCE FAULTS

[75] Inventor: B. Don Russell, College Station, Tex.

[73] Assignee: The Texas A & M University System, College Station, Tex.

[21] Appl. No.: 138,392

[22] Filed: Oct. 15, 1993

[51] Int. Cl.$^6$ .................................................. H02J 13/00
[52] U.S. Cl. .......................... 364/492; 364/581; 364/483; 395/907; 395/915; 361/90; 361/91; 361/92; 361/93
[58] Field of Search ................................... 364/492, 581, 364/482, 495; 371/15.1, 16.5, 20.1; 361/59, 47, 42, 90–93, 111; 324/52, 533, 544

[56] References Cited

U.S. PATENT DOCUMENTS

| | | |
|---|---|---|
| 3,308,345 | 3/1967 | Van Cortlandt Warrington . |
| 3,515,943 | 6/1970 | Van Cortlandt Warrington . |
| 4,165,482 | 8/1979 | Gale .......................................... 324/52 |
| 4,196,463 | 4/1980 | Dickerson ................................ 361/113 |
| 4,241,305 | 12/1980 | Dickerson ................................ 324/52 |
| 4,281,386 | 7/1981 | Kondow et al. . |
| 4,297,738 | 10/1981 | Lee . |
| 4,313,146 | 1/1982 | Lee . |
| 4,347,542 | 8/1982 | Calhoun . |
| 4,347,738 | 9/1982 | Sanderson . |
| 4,466,071 | 8/1984 | Russell, Jr. ............................... 364/492 |
| 4,470,092 | 9/1984 | Lombardi . |
| 4,559,491 | 12/1985 | Saha . |
| 4,644,479 | 2/1987 | Kemper et al. ......................... 395/915 |
| 4,649,515 | 3/1987 | Thompson et al. ..................... 395/918 |
| 4,719,580 | 1/1988 | Nimmersjö. |
| 4,751,653 | 6/1988 | Junk et al. . |
| 4,752,886 | 6/1988 | Gareis . |
| 4,766,549 | 8/1988 | Schweitzer, III et al. . |

(List continued on next page.)

OTHER PUBLICATIONS

C. J. Kim, B. D. Russell, "Classification of Faults and Switching Events by Inductive Reasoning . . . " IEEE Transactions on Power Delivery, vol. 4, No. 3, Jul. 1989, pp. 1631–1637.

G. Zwingelstein et al. "Applications of expert systems and neural networks . . . power plants" Proceedings of the American Power Conference Dec. 1990, pp. 895–900.

Talukdar et al, "Toast: The power system operator's Assistant" IEEE Computer Jul. 1986, pp. 53–59.

Momoh et al, "Integrated Detection and Protection Schemes for High–Impedance Faults on Distribution Systems", 1992 IEEE International Conference on Systems, Man and Cybernetics, pp. 1102–1109 vol. 2.

Russell, "Computer Relaying and Expert Systems: New Tools for Detecting High Impedance Faults", Electric Power Systems Research, vol. 20, No. 1, pp. 31–37, Dec. 1990.

(List continued on next page.)

Primary Examiner—Ellis B. Ramirez
Assistant Examiner—Hal D. Wachsman
Attorney, Agent, or Firm—Flehr, Hohbach, Test, Albritton & Herbert

[57] ABSTRACT

An expert detection system includes a method and apparatus for detecting high impedance faults occurring on a distribution circuit coupled to an AC power source. Based upon an expert's knowledge of high impedance fault behavior and the performance of various fault detection techniques, the expert forms a belief as to whether a high impedance fault has indeed occurred. The expert's beliefs may be adjusted with an elliptic formula, and then used to weight the status output of each technique. The weighted multiple technique outputs are combined to determine whether a high impedance fault has occurred. The expert's beliefs are calibrated during initial start-up by comparison with a confirmed performance history of the detector using a scoring rule. The belief calibration may be included during operation to provide on-line adaption of the expert detector to the changing situations of the distribution circuit.

20 Claims, 3 Drawing Sheets

U.S. PATENT DOCUMENTS

| | | |
|---|---|---|
| 4,785,406 | 11/1988 | Lunderius et al. . |
| 4,795,983 | 1/1989 | Crockett et al. . |
| 4,800,509 | 1/1989 | Nimmersjö. |
| 4,812,995 | 3/1989 | Girgis et al. . |
| 4,851,782 | 7/1989 | Jeerings et al. . |
| 4,853,175 | 8/1989 | Book, Sr. . |
| 4,855,671 | 8/1989 | Fernandes . |
| 4,864,453 | 9/1989 | Bergman et al. . |
| 4,868,704 | 9/1989 | Cavero . |
| 4,871,971 | 10/1989 | Jeerings et al. . |
| 4,878,142 | 10/1989 | Bergman et al. . |
| 4,991,105 | 2/1991 | Pimental . |
| 5,003,486 | 3/1991 | Hendel . |
| 5,018,042 | 5/1991 | Williston et al. ............................ 361/42 |
| 5,047,969 | 9/1991 | Sloane ...................................... 364/581 |
| 5,083,086 | 1/1992 | Steiner ..................................... 324/533 |
| 5,123,017 | 6/1992 | Simpkins et al. ....................... 371/15.1 |
| 5,168,414 | 12/1992 | Horstmann ................................ 361/59 |
| 5,208,542 | 5/1993 | Tennies et al. .......................... 324/544 |
| 5,241,444 | 8/1993 | Yeh ............................................ 361/59 |
| 5,245,498 | 9/1993 | Uchida et al. .............................. 361/47 |
| 5,390,106 | 2/1995 | Cederblad et al. ......................... 361/90 |
| 5,428,549 | 6/1995 | Chen ......................................... 364/492 |
| 5,428,553 | 6/1995 | Chiba et al. ............................. 364/492 |

OTHER PUBLICATIONS

Kim et al., "High–Impedance Fault Detection System Using an Adaptive Element Model," IEEE Proceedings–C, (Generation, Transmission, and Distribution), Mar. 1993, UK, vol. 140, No. 2, pp. 153–159.

Watson, et al., "Expert System Structures for Fault Detection in Spaceborne Power Systems", Proceedings of the 23rd Intersociety Energy Conversion Engineering Conference, Denver, Colo., Jul. 1988, pp. 389–394, vol. 3.

M. Aucoin, B. D. Russell, "Distribution High Impedance Fault Detection Utilizing High Frequency Current Components," *IEEE Transactions on Power Apparatus and Systems*, vol. PAS–101, No. 6, Jun., 1982, pp. 1596–1606.

M. Aucoin, B. D. Russell, "Detection of Distribution High Impedance Faults Using Burst Noise Signals Near 60 Hz," *IEEE Tranactions on Power Delivery*, vol. PWRD–2, No. 2, Apr., 1987, pp. 342–348.

B. D. Russell, B. M. Aucion, T. J. Talley, "Detection of Arcing Faults on Distribution Feeders," EL–2757, Research Project 1285–3, Final Report, Dec., 1982.

Carl Lee Benner, "An Algorithm for Faulted Phase and Feeder Selection Under High Impedence Fault Conditions," A Thesis Submitted to the Graduate College of Texas A&M University, Aug., 1988.

Patrick Wayne Carswell, "The Detection of High Impedance Faults Using Random Fault Behavior," A Thesis Submitted to the Graduate College of Texas A&M University, Aug., 1988.

C. Benner, P. Carswell, B. D. Russell, "Improved Algorithm for Detecting Arcing Faults Using Random Fault Behavior," *Electric Power Systems Research*, vol.17, 1989, pp. 49–56.

Energy Analysis Fault Detection System, U.S. Patent Application Serial No. 08/138,146, filed Oct. 15, 1993, invented by Russell et al.

ARC Spectral Analysis System, U.S. Patent Application Serial No. 08/138,489, filed Oct. 15, 1993, invented by Russell et al.

Load Analysis System for Fault Detection, U.S. Patent application Serial No. 08/138,144, filed Oct. 15, 1993, invented by Russell et al.

Load Extraction Fault Detection System, U.S. Patent Application Serial No. 08/138,413, filed Oct. 15, 1993, invented by Russell et al.

Randomness Fault Detection System, U.S. Patent Application Serial No. 08/138,410, filed Oct. 15, 1993, invented by Russell et al.

ARC Burst Pattern Analysis Fault Detection System, U.S. Application Serial No. 08/138,477, filed Oct. 15, 1993, by Russell et al.

EXPERT SYSTEM FOR DETECTING HIGH IMPEDANCE FAULTS

BACKGROUND OF THE INVENTION

The present invention relates generally to an expert detection system for use with an electrical utility power system, and more particularly to an expert detection system for detecting high impedance faults on power lines, such as on a utility's distribution circuit feeder lines.

High impedance, low current faults, such as a broken power line conductor which is touching the ground, are more difficult to detect than permanent overcurrent faults. Conventional overcurrent protection devices have time delays which allow clearing of a temporary fault, such as the momentary contact of a tree branch with a power line. The conventional overcurrent protection devices will only deenergize the power line if the overcurrent fault persists. High impedance, low current faults may initialize the timing circuits of the overcurrent protection devices, but by the end of the delay, the high impedance nature of the fault limits the fault current to a low value. The overcurrent protection devices are unable to distinguish this low fault current from the levels of current ordinarily drawn by customers, so the power line may remain energized even though a conductor has broken. Preferably, this event should trigger "a trip" or opening of a circuit breaker to deenergize the power line.

Unfortunately, distinguishing high impedance faults from the other normal system events and activities is quite complicated. While it is relatively easy to detect the presence of any fault on a distribution feeder, including high impedance faults, it is quite difficult to distinguish high impedance faults from normal system loads and switching operations for a variety of reasons. For example, the current signatures of high impedance faults resemble many normal system events and activities, so the high impedance faults cannot be distinguished by commercially available overcurrent relays. As a further complication, high impedance faults behave differently in different fault situations, such as different seasons and geographic locations. The ability to distinguish high impedance faults from the normal power system events largely determines the relative balance between security and dependability of a distribution feeder protection system.

Over the past few years, several high impedance fault detection techniques have been developed which show somewhat satisfactory performances. The inventor has been involved in various research projects which have yielded several detection methods each having good individual performance. For example, in the inventor's previous U.S. Pat. No. 4,466,071, a high impedance fault detection apparatus and method detect high impedance arcing faults by monitoring the duration of an increase in the magnitude of the high frequency current components having frequencies of 1,000 Hz and above. This detection system uses a microcomputer which performs the monitoring. When a fault occurs, the microcomputer either sets a flag to indicate the occurrence of a fault or trips a circuit breaker to deenergize the faulted power line.

In analyzing the results of these earlier research efforts, it becomes apparent that no single technique or approach offers the sensitivity and discriminatory fault detection required to accurately distinguish a high impedance fault from normal system events and activities. Furthermore, no single detection technique provides a protection system having satisfactory security, dependability and reliability to both protect the public from the dangers of a downed conductor, and to minimize unnecessary power outages from false trips.

Thus, a need exists for an improved expert detection system for detecting high impedance faults on power lines, such as on distribution feeder lines, which is directed toward overcoming, and not susceptible to, the above limitations and disadvantages.

SUMMARY OF THE INVENTION

The presently available protection systems and relays are incapable of accurately distinguishing high impedance faults, such as a downed power line conductor, from other normal system events and activities. To accurately distinguish these high impedance faults from normal power line occurrences, an expert high impedance fault detection system coordinates the status outputs of multiple fault detection techniques in a coordinated protection system configuration.

In accordance with an illustrated embodiment of the present invention, a method is provided of detecting high impedance faults occurring on a distribution circuit coupled to an AC power source. The method includes the steps of analyzing a parameter of power flowing over the distribution circuit using a plurality of fault detection techniques each providing a number of fault indications. In a weighting step, the number of fault indications from each technique is given a weight which may be adjusted according to an elliptic formula. In a combining step, the weighted number of fault indications from each technique are combined together to determine whether a high impedance fault has occurred. When a status input signal responsive to the actual status of the distribution circuit is provided, the method may also include a calibrating step for calibrating the fault detection technique weighting.

An overall object of the present invention is to provide an expert detection system for detecting high impedance faults on a power system distribution feeder line.

Another object of the present invention is to provide an expert detection system which is secure, and dependable, and which minimizes unnecessary customer outages.

A further object of the present invention is to provide an expert detection system which improves public safety, by detecting and distinguishing high impedance faults from normal system events and activities, and which deenergizes a feeder line experiencing a high impedance fault.

The present invention relates to the above features and objects individually as well as collectively. These and other objects, features and advantages of the present invention will become apparent to those skilled in the art from the following description and drawings.

DETAILED DESCRIPTION OF A PREFERRED EMBODIMENT

Figure 1:
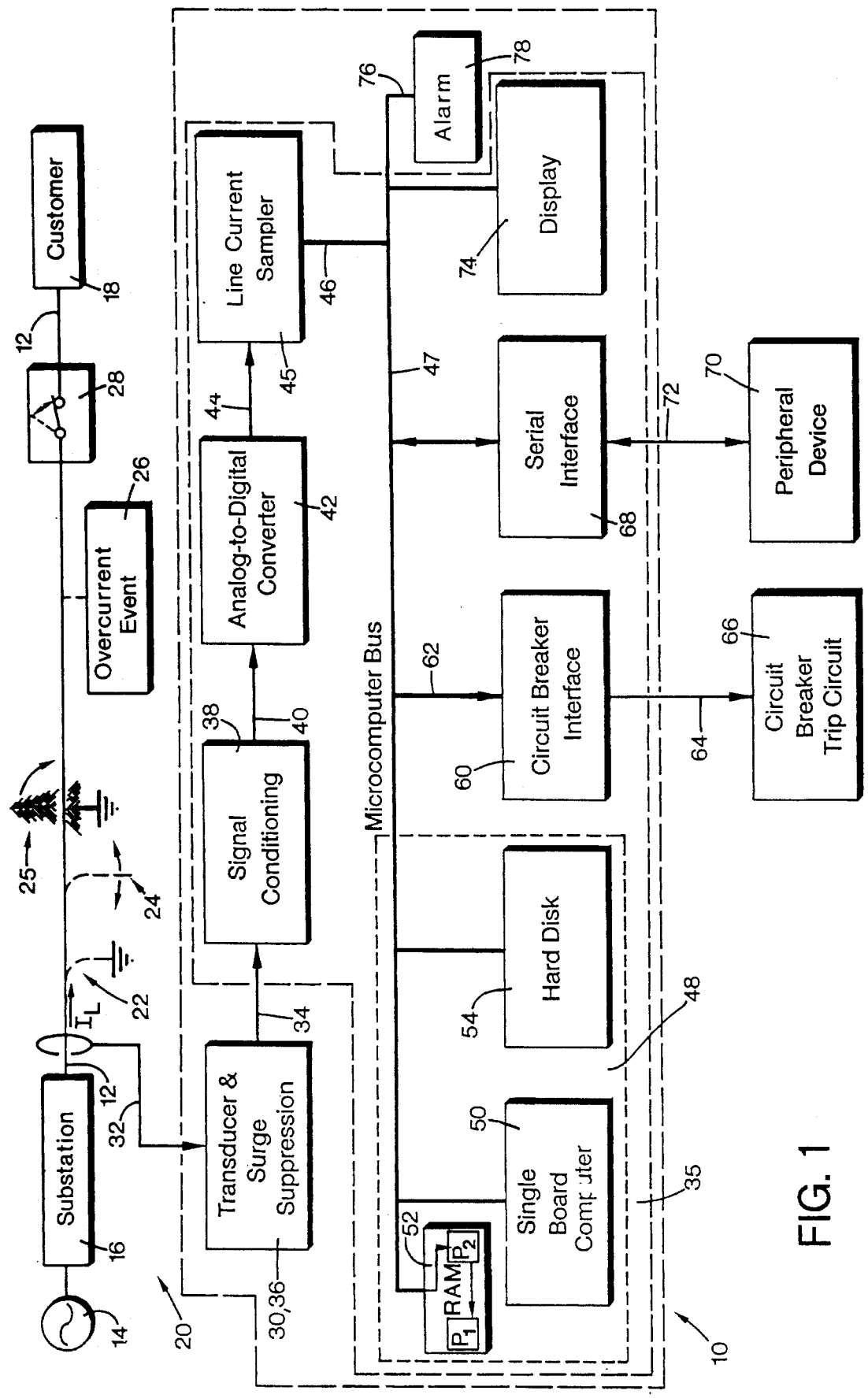
FIG. 1 is a schematic block diagram of one form of an expert detection system of the present invention shown coupled to a distribution circuit of a power system.

FIG. 1 illustrates an embodiment of an expert detection system apparatus or expert detector 10 constructed in accordance with the present invention. The expert detector 10 detects and distinguishes a high impedance fault from other normal occurrences on a distribution system conductor, power line, or feeder 12. The feeder 12 receives power from an AC power source, such as a generating station 14, through a substation 16. Other feeder lines (not shown) may also receive power from the generating station 14 and exit the substation 16. The feeder line 12 delivers power from the substation 16 to a variety of customers, such as customer 18. Altogether, the generating station 14, substation 16, and feeder 12 delivering power to the customer 18 illustrate a portion of an electrical utility's power system 20.

Between the substation 16 and the customer 18, the feeder line 12 may be subjected to a variety of different types of events, activities and faults. For example, the feeder may experience a high impedance, low current fault, such as a downed conductor 22, or a normal system event, such as a switching event 24 performed by a conventional recloser mechanism, or the like. Although utility engineers distinguish between recloser operation and switching events, with reclosers operating automatically and switches being manually operated, the operation of both are collectively referred to herein as "switching events" unless otherwise indicated. Regarding the various faults and normal operations of the power system 20 described herein, the following terms are used herein interchangeably: situation, occurrence, operation, event, and activity.

The expert detector 10 includes a monitoring device, such as a transducer 30, coupled to the feeder 12, as indicated schematically by line 32, to monitor a parameter of the power flowing therethrough. This power flow parameter is defined broadly to include any type of parameter indicative of normal and fault conditions on feeder 22, including, but not limited to, the voltage or load current and harmonics thereof, frequency, power factor, real or reactive power flow, etc. The monitoring device is defined broadly herein to include sensing devices, detecting devices, and any other equivalent form thereof known to be interchangeable by those skilled in the art. The illustrated transducer 30 senses or monitors a load current $I_L$ flowing through feeder 12. In response to the load current $I_L$, the transducer 30 produces a load current signal 34 that indicates the magnitude and waveform of current flowing in feeder 12. The transducer 30 may be a conventional transducer or equivalent device, such as multiple current transformers, typically with one current transformer per phase plus one on the neutral.

The expert detector 10 also includes surge protection, for example a surge suppressor or protector 36, such as arc gap. The surge protector 36 may be supplied with the transducer 30, as illustrated, or as a separate component. The surge protector 36 protects the expert detector 10 from power surges on the feeder 12, such as those caused by lightening strikes or the like.

A controller 35 receives the load current signal 34 from the transducer 30. The controller 35 includes a signal conditioner 38 for filtering and amplifying the load current signal 34 to provide a clean conditioned load current signal 40. Preferably, the signal conditioner 38 includes a low pass filter for satisfying the Nyquist criteria of sampling known to those skilled in the art. The signal conditioner 38 also amplifies the load current signal 34 for the appropriate gain required by an analog to digital (A/D) converter 42. For example, the dynamic range of signals received on a power system 20 range from 10 Amps to 10,000 Amps, so the signal conditioner 38 appropriately scales these signals for conversion by the A/D converter 42 from an analog signal 40 into a digital load current signal 44.

The controller 35 includes a discrete A/D converter 42 when transducer 30 is an analog device. The transducer 30 may also be implemented in a digital device which incorporates the signal conditioning function of conditioner 38 and the analog-to-digital conversion function of the A/D converter 42.

The expert detector 10 may have an optional digital signal processor 45 for transforming the digitized time domain load current signal 44 into a frequency spectrum signal 46. The frequency spectrum signal 46 is supplied via a microcomputer bus 47 to a computing device, such as a microcomputer system or microprocessor 48. The digital signal processor 45 is one embodiment used for the processing of signals for the invention, but it is not a necessary portion of the invention. For example, it is possible to implement the signal processing function in the microprocessor 48.

The illustrated microcomputer system 48 has a computer, such as a single board computer 50, coupled with a memory device, such as a random access memory 52, and a data storage device, such as a hard disk 54. A suitable microcomputer system 48 may include a conventional personal computer or any other equivalent form thereof known to be interchangeable by those skilled in the art.

The controller 35 includes a circuit breaker interface 60 for receiving a trip command signal 62 from the computer 50 via the bus 47. In response to the trip command signal 62, the interface 60 sends a trip signal 64 to a circuit breaker trip circuit 66. The trip circuit 66 drives a circuit breaker (not shown) located at substation 16 to deenergize the feeder 22. The controller 35 may include an optional serial interface 68, such as a modem for sending and receiving a peripheral device signal 70 over a telephone network. The interface 68 may communicate with an external peripheral device 70, such as a remotely located power distribution control center. In some systems, the peripheral device 70 may provide a remote input to the expert detector 10 via the serial interface 68, for example to provide an input of the actual status of the feeder line (see FIG. 2), or to override previous programming of the expert detector, such as the initial settings, sensitivity settings, operational delays, etc.

The controller 35 may also include an output device, such as a visual display device 74 or a printer. Preferably, the output display provides a visual indication of the status of the expert detector 10, the feeder line 12, and previous operating conditions of the feeder. The controller 35 may also provide an alarm signal 76 via bus 47 to an alarm 78 which may be visual, audible, or both.

Due to the uncertainty associated with various high impedance fault detection techniques, it is not desirable to base output decisions, such as whether to trip a breaker and deenergize a line, upon a single power flow parameter, such as load current or harmonic frequencies. Certain normal system events, such as switching 24, may invoke one fault detection technique to falsely indicate the occurrence of a fault. To provide security against such false detections, as described further below, the expert detector 10 weights the outputs of several techniques according to an expert's beliefs in the accuracy of each technique, then combines the weighted outputs before deciding whether to trip or not.

Operation

Figure 2:
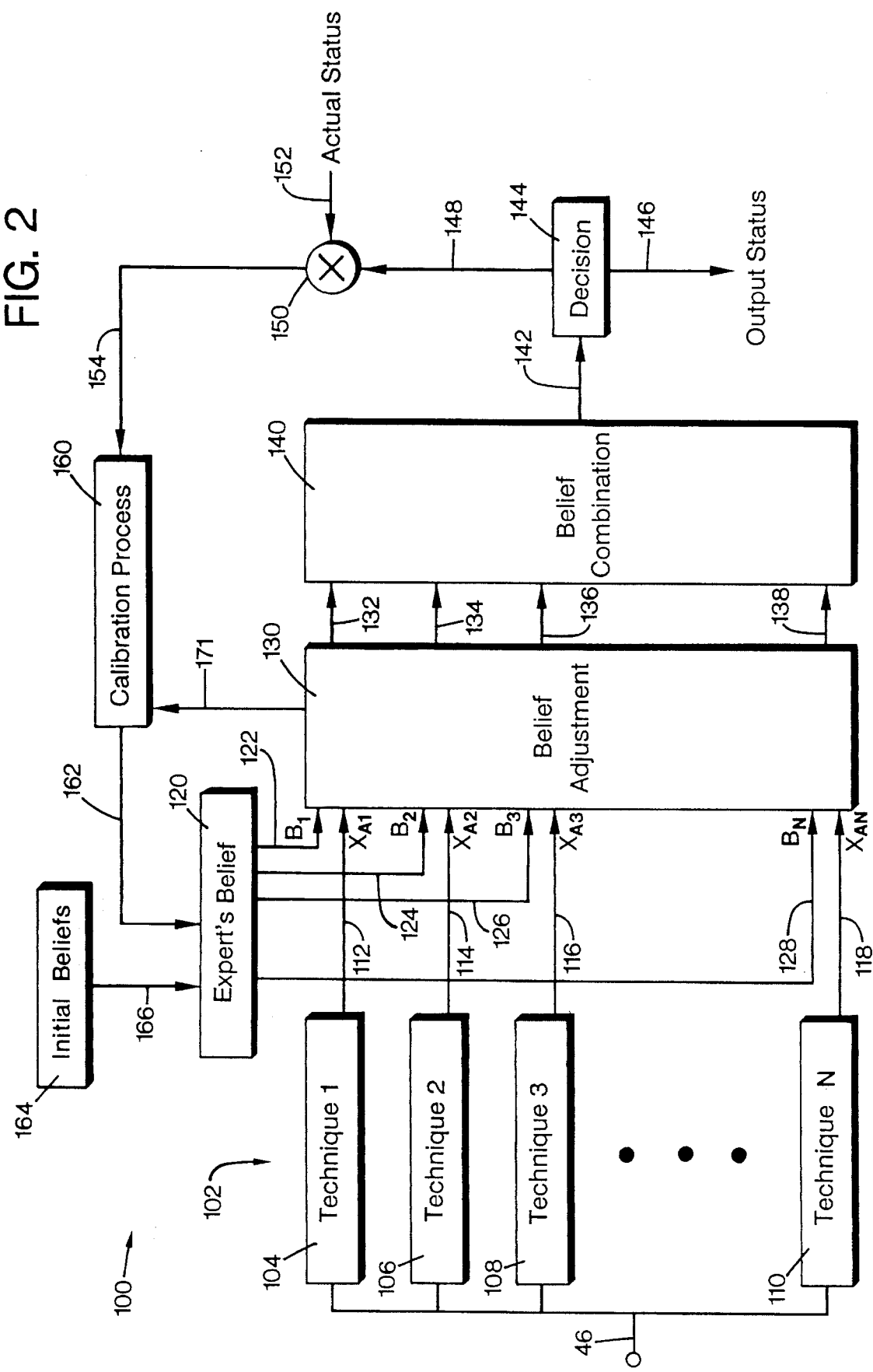
FIG. 2 is a block diagram of one manner of operating the expert detection system of FIG. 1.

An operational overview of the illustrated expert detector 10 will be given first, followed by operational descriptions the component portions of the detector 10. FIG. 2 shows a block diagram 100 of the expert detector 10 illustrating its component operation and a method of detecting a high impedance fault 22. The expert detector 10 includes a detection technique library 102 of multiple high impedance fault detection techniques, such as a first technique 104, a second technique 106, a third technique 108, and so forth through a final Nth technique 110. Each of the illustrated techniques 104–110 receive the frequency spectrum signal 46 and interpret this data according to their respective technique routines to provide first ($X_{A1}$), second ($X_{A2}$), third ($X_{A3}$), and final ($X_{AN}$) status output signals 112, 114, 116 and 118, respectively. Preferably, the techniques 104–110 are implemented in software, and stored on the hard disk 54, although it is apparent that hardware, or combination hardware and software, implementations are also feasible.

For example, one such detection technique is disclosed in the inventor's U.S. Pat. No. 4,466,071, hereby incorporated by reference herein and referred to as the "Russell technique." In the Russell technique, the high frequency components of the alternating current in a high voltage power line, such as feeder 12, are monitored. These high frequency components are then evaluated using a preprogrammed microcomputer to determine the occurrence of a significant increase in magnitude of the high frequency components. If the increase persists for a prescribed period of time, and follows a prescribed pattern, then the Russell technique determines that a high impedance fault has indeed occurred. For example, if more than 32 of 255 cycles after an event detection have an energy level of 50% greater than a pre-event average energy level, and the Russell technique provides an status output signal of "fault" to indicate the occurrence of a high impedance fault 22. A count of less than 30 cycles having such an energy level indicate normal system operation, such as the operation of switch 24, and the Russell technique produces a "no fault" status output signal.

Another detection technique is disclosed in a patent application entitled "Load Analysis System," Ser. No. 08/138,144, filed Oct. 15, 1993. The present inventor is one of the coinventors of the Load Analysis System application, and both applications share a common assignee.

The above two examples of detection techniques demonstrate two parameters for the operation of the expert detector 10. The expert detector 10 may operate using any detection technique which provides either "fault/no fault" or "true/false" type indications, and the execution time to produce the indication. It is apparent that other techniques known to those skilled in the art which produce these indications may also be used, as well as new techniques to be developed in the future.

The expert detector 10 has an expert's belief portion 120 which provides first ($B_1$), second ($B_2$), third ($B_3$), and final ($B_N$) belief or weighting signals 122, 124, 126 and 128, each corresponding to an expert's belief as to the accuracy of each of the techniques 104–110, respectively. A belief adjustment or weighting portion 130 adjusts each of the status signals 112–118 by weighting each of the signals 112–118 with the respective expert's belief weighting signals 122, 124, 126 and 128 to provide first, second, third and final adjusted belief signals 132, 134, 136 and 138, respectively. For example, the $X_{A1}$ output status signal is adjusted by weighting it according to the $B_1$ belief signal, in a manner described further below, to provide the first adjusted belief signal 132.

A belief combination portion 140 combines each of the adjusted belief signals 132–138 with an uncertainty reasoning method, described further below, into a final combined evidence signal 142. The final combined evidence signal 142 is provided to a decision portion 144. The decision portion 144 provides an output status decision signal 146 along the microcomputer bus 47 to the display 74, the serial interface 68, and if required, the circuit breaker interface 60 and alarm 78.

During operation, the output status signal 146 from the decision portion 144 is the final expert belief of the status from the expert detector 10. To calibrate the initial belief on each detection technique 104–110, the decision portion 144 provides a decision output feedback signal 148 to a comparator 150. The comparator 150 is also provided for receiving a status input signal 152, corresponding to the real or actual status of the feeder 12, to provide feedback as to whether conditions are normal (i.e., normal switching 24) or a high impedance fault 22 has indeed occurred. The comparator 150 provides a resultant feedback status signal 154 corresponding to the difference between the decision output feedback signal 148 and the status input signal 152.

The term "actual status" is used herein to indicate a verified or confirmed status of the feeder 12, which is typically verified by an operator who physically inspects the feeder 12. The "actual status" of the line is in contrast to the output status signal 146, which is the expert detector's best guess as to whether a fault occurred, and thus may be right or wrong. Indeed, the correctness of the output status signal 146 is determined from the status input signal 152, when available.

During an initial start-up or acquaintance period, the status input signal 152 may be applied from a large number of confirmed event data sets. During operation, the status input signal 152 may be applied on a regular periodic basis or only occasionally on an operator's mandate. For example, if the expert detector 10 indicates a high impedance fault 22 occurred and the feeder 12 is deenergized, an operator may physically inspect the deenergized feeder 12 to check the actual status. The operator then inputs the status input signal 152 as to whether the expert detector 10 was correct or not in indicating the occurrence of a high impedance fault 22 requiring a trip.

During initial start-up, the expert detector 10 may include a calibration portion 160 for receiving the resultant feedback status signal 154 from comparator 150. The calibration portion 160, feedback status signal 154, and actual status signal 152 are portions of the expert detector 10 which may be included during both initial start-up and operation, but they are primarily for use during initial start-up. In response to the resultant feedback status signal 154, the calibration portion 160 calibrates the expert's beliefs, such as by a performance scoring rule described further below. The calibration portion 160 provides a calibrated belief signal 162 to the expert's belief portion 120.

Upon initialization of the system, an initial beliefs portion 164 provides an initial belief signal 166 to the expert's belief portion 120. The initial belief signal 166 corresponds to a set of initial beliefs for each of the techniques 104–110 in library 102. If the initial beliefs are made by an expert who is knowledgeable about the strengths and weaknesses of the detection algorithms, the calibration process in the acquaintance period may not be necessary.

After the initial start-up and through the calibration process, the expert detector 10 operates normally without the inclusion of the calibration portion 160. The learning process with calibration is optional for enhancement of the operation of the expert detector 10, but it is not necessary for operation of the expert detector 10.

Preferably, the component portions described above are implemented in software, and stored on the hard disk 54. However, it is apparent that the expert's belief portion 120, the belief adjustment portion 130, the belief combination portion 140, the decision portion 144, the comparator 150, the calibration portion 160, and the initial belief portion 164 may be implemented as hardware devices, software routines, or as combinations thereof, known to be structural equivalents by those skilled in the art.

Detection Techniques

Each illustrated detection technique 104–110 is performed with its own detection logic to generate, over time, a series of status outputs which may include one or more fault indication outputs, given as the status output signals 112–118. Typically, each iteration of a detection technique produces a single fault indication status output that is either "fault" or "no-fault" (N/F). The execution time required for each technique 104–110 to generate a status output may be different. The expert detector 10 coordinates the status outputs of techniques 104–110 by looking at the series of status outputs from each technique over an amount of time, called a decision time period or window. Preferably, the decision time window is set at a fixed value which accommodates all the status outputs of the techniques 104–110. To provide security against false fault detections, the decision time window preferably is long when compared to the time frame during which an overcurrent relaying operation occurs. For example, Table 1 illustrates possible execution times and a maximum total number of status outputs ($X_M$) for each of the detection techniques 104–110 for a thirty second decision time window.

TABLE 1

Detection Technique Status Outputs
(30 second Decision Time Window)

|  | Execution Time | Max. Status Outputs |
| --- | --- | --- |
| Technique 1 | 1 sec. | 30 |
| Technique 2 | 2 sec. | 15 |
| Technique 3 | 5 sec. | 6 |
| Technique N | 10 sec. | 3 |

The data generated by all of the techniques 104–110 during the decision time window may be referred to as an analysis unit of data or a matrix of fault indications, shown in Table 2 for techniques 104–110. The analysis unit data may be stored in RAM 52. The expert detector 10 ultimately bases the output status decision signal 146 upon the analysis unit data. The data within the analysis unit is continually updated by displacing the oldest data with new data. Preferably, the illustrated 30 second long analysis unit is updated every second by adding the newest indication and removing the oldest indication, thereby providing a moving window matrix of fault indications. During any decision time window, one or more of these detection techniques may provide one or more actual fault indications ($X_A$) as a status output.

TABLE 2

Fault Indications During one Decision Time Window

|  | First | Second | Third . . . | $X_M$ | $X_A$ |
| --- | --- | --- | --- | --- | --- |
| 1. | Fault | N/F | Fault | Fault | 3 |
| 2. | Fault | N/F | Fault | N/F | 2 |
| 3. | N/F | Fault | N/F | N/F | 1 |
| N. | Fault | N/F | N/F | — | 1 |

In Table 2, no value is given for Technique N in column $X_M$ because in the illustrated embodiment, the ten second execution time for Technique N and a 30 second decision time window yields three status outputs, that is, $X_M=3$.

In the illustrated embodiment, although the decision time window is selected at 30 seconds, a decision as to the status of feeder 12 is generated much more frequently. The output status decision signal 146 is generated at the end of a much shorter time period referred to as a decision interval. In the illustrated embodiment, the decision interval is on the order of one second, so the decision portion 144 generates the decision signal 146 once every second.

Expert's Beliefs

While the output of each technique 104–110 is definite, occasionally the techniques provide false indications of the occurrence of a high impedance fault, for example, indicating a fault when only a normal switching event 24 has occurred. For each of the detection techniques 104–110, a human expert in the field has arrived at an opinion or belief as to the accuracy of the technique. The belief assigned by the expert indicates the expert's confidence level in the detection technique's ability to accurately indicate when a fault 22 has indeed occurred. These accuracy beliefs are based upon a subjective belief formed from the expert's knowledge, expertise, and experiences with the technique, such as during performance studies under different and varying parameters, including different seasons of the year, installation locations, distribution voltage levels, and feeder protection system configurations.

The beliefs in a particular detection technique may be initially derived by analyzing the performance of the technique for a given situation where the actual status of the feeder 12 is known. The expert's belief in each technique has a degree of uncertainty, which may be expressed as a percentage of certainty or a belief value, between 0 and 100% certainty. The expert's belief in the accuracy of a given technique is arrived at independently from the beliefs in the other detection techniques stored in library 102.

Within the decision time window, theoretically, there are two elements of fault indications:

(1) the maximum possible number of fault indications $X_M$, and (2) the actual number of fault indications $X_A$. When the actual and maximum number of fault indications are equal, i.e., $X_A = X_M$, experts in the field believe with a confidence level of 99% or above that a fault has indeed actually occurred, no matter what the expert's original beliefs may have been. However, when the actual number of fault indications $X_A$ are greater than one and less than the maximum number of fault indications $X_M$, the situation is so uncertain or fuzzy, that experts in the field are often hesitant to assign any exact number to their beliefs. In a sense, this is a situation of measuring an uncertain or fuzzy environment quantitatively because linguistic belief phrases (maybe, probably, likely, etc.) are expressed in numerical terms and decisions are then made based upon these numerical quantities.

This assigning of the expert's belief or confidence level is accomplished by the expert's belief portion 120 which generates the $B_1$ through $B_N$ belief weighting signals 122–128. The expert's initial belief signal 166, which may be initially derived from data at another installation site, is supplied by the initial belief portion 164.

Belief Adjustment

Figure 3:
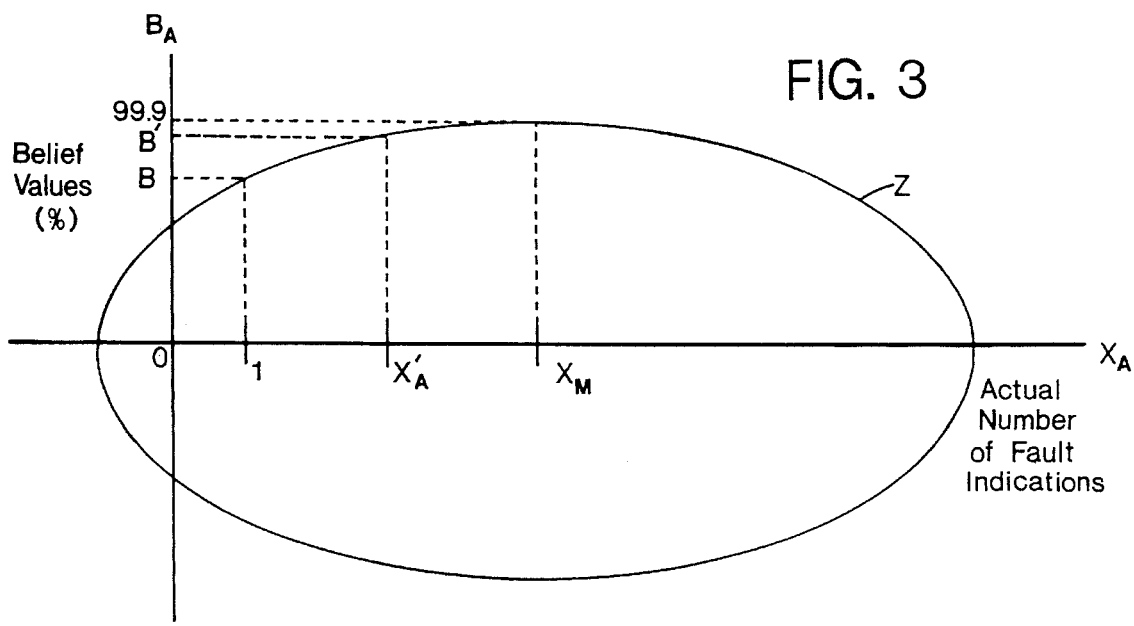
FIG. 3 is a graph of an elliptic relationship used by the expert detection system of FIG. 1.

The belief adjustment portion 130 weights the output status signals 112–118 from techniques 104–110 in response to the belief signals 112–118. If a technique provides more than one fault indication output during a decision time period, the expert's belief may be adjusted using an exponential type of curve. A true exponential or parabolic curve proved an inadequate candidate, because each curve converges to a certain value, such as 1.0, at $X_A = \infty$(infinity). Thus, the illustrated belief adjustment portion 130 operates on a superior elliptical curve or ellipse Z as shown in FIG. 3. The X-axis represents the actual number of fault indications $X_A$. The point $X_M$ corresponds to the maximum number of status output fault indications for a technique (see Table 1). The Y-axis represents the expert's adjusted belief $B_A$ values in per cent, with the highest assigned belief being 99.9% when the actual number of fault indications equals the maximum number of status outputs for a technique, i.e., $X_A=X_M$.

To quantify this uncertain, fuzzy area of the "beliefs of experts," it may be intuitively assumed that the belief about to be adjusted lies along the line of an exponential type of curve which increases along the X-axis. Preferably, this hypothetical belief adjustment curve Z is formulated to meet the following guidelines:

(1) A discrete curve Z, having:
  (a) A belief value of B at $X_A=1$;
  (b) An exact belief value of, for instance, 100% or 99.9% at the maximum number of fault indications $X_M$; and
(2) An elliptical shape.

By shifting the ellipse Z along the X-axis, while setting one-half of the minor diameter equal to a certain belief value, for example 99.9%, and by changing the eccentricity, the center of the ellipse may be positioned to correspond to the maximum number of fault indications $X_M$. The belief adjustment portion 130 then operates according to the following elliptic formula:

$$B_A=[(0.999)^2-((X_A-X_M)^2 \div (1-X_M)^2)(0.999^2-B^2)]^{1/2}$$

For example, if the actual number of fault indications $X_A$ during a decision time period equals $X_A'$ in FIG. 3, a new adjusted belief value or weight B' is assigned by the adjustment portion 130 to the detection technique.

Belief Combination

The belief combination portion 140 combines each of the weighted or adjusted belief signals 132–138 according to an uncertainty reasoning method. For example, the combination of the adjusted beliefs may be performed by an easily computable version of what is known as the Dempster-Shafer theory. In the illustrated embodiment, an expert's belief may be represented in terms of a degree of support, such as $S_1$ and $S_2$, as shown below:

Belief[1]=$S_1$, and

Belief[2]=$S_2$.

These equations represent simple support functions with the respective degrees of support $S_1$ and $S_2$. Given these equations, a supportive overall evidence S supporting the likelihood that a fault 22 has indeed occurred, may be expressed as:

$$S=1-(1-S_2).$$

When one of the detection techniques 104–110 has at least one status output of "Fault," this supports the proposition that a fault has indeed occurred with the certainty of the degree of support expressed by the expert's belief. When one of the techniques 104–110 has all status outputs indicating "no fault" ("N/F" in Table 2), then this technique output fails to support the proposition that a fault has occurred. The belief combination portion 140 collects each of the weighted belief signals 132–138 which are indicating a "Fault" output and combines these "Fault" signals into a general supportive evidence of a fault $S_F$ according to:

$$S_F=1-[(1-B_A[1])(1-B_A[2]) \ldots (1-B_A[N_F])].$$

In this formula $B_A[i]$ indicates an expert's adjusted belief on the $i^{th}$ technique indicating the occurrence of a fault. $N_F$ indicates the total number of techniques having at least one fault indication during the current decision time window.

The adjusted belief signals 132–138 indicating all "no fault" output status conditions are collected and combined by the belief combination portion 140 into a general non-supportive evidence of a fault $S_N$ according to:

$$S_N=1-[(1-B_A[1])(1-B_A[2]) \ldots (1-B_A[N_N])].$$

The variable $N_N$ indicates the total number of techniques having no fault indications during the current decision time window, that is, where the actual number of fault indications $X_A$ is equal to zero. From these values, a combined evidence of a fault condition $C_F$ and a combined evidence of a no fault condition $C_N$ are determined by the belief combination portion 140 as follows:

$$C_F=[S_F(1-S_N)] \div [1-(S_F S_N)]$$

$$C_N=[S_N(1-S_F)] \div [1-(S_F S_N)].$$

The combined evidence of a fault $C_F$ is supplied to the decision portion 144 as the final combined evidence signal 142. To determine the status of the monitored circuit with the combined evidence signal 142, a set of threshold values are provided to decide the limits of the combined evidence: THRESHOLD$_F$ for "fault" status, THRESHOLD$_{AL}$ for "alarm" or "indeterminate" status, and THRESHOLD$_N$ for "normal" status. These threshold values may vary for different installation sites, or may be periodically recalibrated by an operator to accommodate for varying seasonal conditions and the like, as described further below.

Based upon the combined evidence and the threshold values, the decision portion 144 determines whether a fault has occurred according to the following considerations:

For $C_F$>THRESHOLD$_F$, then a fault has occurred;

For $C_F$<THRESHOLD$_N$, then conditions are normal;

For THRESHOLD$_{AL}$<$C_F$<THRESHOLD$_F$, then it is an indeterminate or alarm condition.

This determination is made once at the end of each decision interval, which in the illustrated embodiment is once every second, and is based upon the analysis unit of data determined during the immediately previous 30 seconds of the decision time period. This determination of a fault occurrence, normal conditions, or an indeterminate state is supplied by the decision portion 144 as the output status decision signal 146 and the decision output feedback signal 148. A fault determination triggers the trip signal 64, and an indeterminate status triggers the alarm signal 76, as described above. When conditions are normal, no action is taken.

Calibration of Expert's Beliefs

For each installation site across the country, the actual number of faults indications $X_A$ provided by each technique 104–110 are likely to be different for otherwise electrically identical faults. These differing actual fault indication numbers $X_A$ result from the varying environmental conditions existing at the different installation locations, or from seasonal changes occurring at a single installation site. For example, the type of soil (sandy, rocky or loamy), and the moisture content of the soil (wet, dry or snow covered), all affect the flow of fault current and vary the impedance of the fault 22. Thus, these environmental conditions require periodic adjustment and recalibration of the expert detector 10.

Although experts have good experience and a good sense of how to assign their beliefs to a particular detection technique 104–110, these beliefs are still quite subjective. Initially during the acquaintance process at installment, beliefs are assigned by the initial belief portion 164 based upon computer simulations of faults. Computer simulations are used because it would be too inconvenient to actually cause customer power outages merely for system start-up or recalibration. Thus, the expert's beliefs are hypothetically determined through extrapolation based on the expert's beliefs derived at other sites or during other seasons. However, when a belief which is calibrated for one installation site is then applied without change to another site, the belief may be inadequate for the new site. For example, the varying behavior of the fault currents at a new site are often unpredictable based on data and beliefs derived at another installation site. Furthermore, these empirically calibrated beliefs do not always guarantee the same high performance across the board for each type of fault 22 and switching event 24 encountered at the new site.

Therefore, the expert detector 10 preferably has the calibration portion 160 for evaluating and assessing the accuracy of these subjective beliefs. With this assessment, the expert detector 10 is adaptive to the varying behaviors of high impedance faults 22 in differing environmental situations. Preferably, the calibration portion 160 automatically calibrates the expert's belief portion 120 based upon the various new situations encountered. Automatic calibration may be achieved by using the concept of calibration in conjunction with a scoring procedure described further below. This automatic calibration scheme may be used during installment of the expert detector 10 to calibrate the expert's initial belief portion 164, or after installation to recalibrate the expert's belief portion 120.

Figure 4:
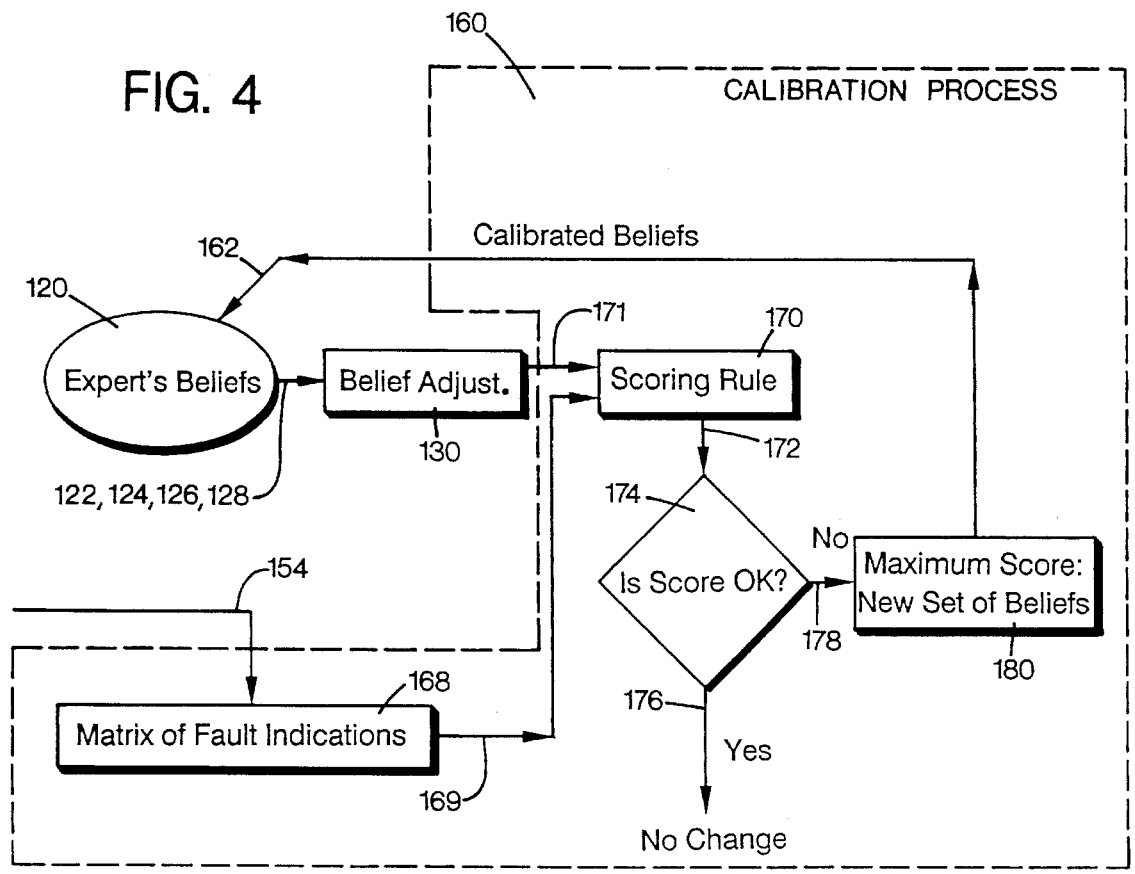
FIG. 4 is a flow chart illustrating one manner of calibrating the expert detection system of FIG. 1.

Referring to FIG. 4, the calibration portion 160 includes a matrix of fault indications portion 168 for storing data, such as that shown in Table 3 for a total of N techniques. This matrix portion 168 stores the confirmed performance history of each technique. The notation at the bottom of Table 3 "Confirmed Actual Status" refers to confirmation as to whether or not a fault 22 has indeed occurred, which is provided by the actual status input signal 152. A new column of confirmed data, such as those labeled "1, 2, 3, . . . , Final," may be added to the matrix portion 168, up to a maximum column storage limit. The data stored under each column of Table 3 indicates the number of actual fault indications $X_A$ provided by the techniques, which corresponds to the data, when confirmed, shown in the $X_A$ column of Table 2. The matrix portion 168 may be stored in the RAM 52 or on the hard disk 54. The matrix portion 168 provides this data as a matrix output signal 169.

TABLE 3

Matrix of Fault Indications Confirmed Actual Status History
Performance History of Analysis Units

|  | 1 | 2 | 3 | . . . | Final |
|---|---|---|---|---|---|
| Technique 1 | 1 | 0 | 0 |  | 0 |
| Technique 2 | 2 | 0 | 1 |  | 0 |
| Technique 3 | 0 | 0 | 1 |  | 0 |
| Technique 4 | 0 | 0 | 0 |  | 0 |
| Technique 5 | 1 | 3 | 2 |  | 0 |
| Technique 6 | 3 | 0 | 1 |  | 1 |
| Technique N | 1 | 0 | 1 |  | 0 |
| Confirmed Status | Fault | No Fault | Fault |  | No Fault |

The calibration portion 160 has a scoring rule portion 170 which measures the accuracy of each technique 104–110. The scoring rule portion 170 receives inputs of the matrix output signal 169 and an adjusted belief input signal 171 from the belief adjust portion 130. The adjusted belief input signal 171 is a composite signal indicating the expert's adjusted belief in the techniques, and carries the same information as signals 132–138.

The scoring rule portion 170 preferably uses a scoring rule resembling the economic monetary value equation often used in the business world when determining whether or not to invest in an asset. Using the illustrated rule, each detection technique 104–110 is given a reward amount U, which is a function U(G, B). The variable B represents the belief value corresponding to a given event. The variable G is assigned either a one or a zero, with G=1 if the guess is correct, and G=0 if the guess is wrong. The term "guess" refers to the adjusted detection technique's determination as to whether or not a fault 22 has occurred. The correctness of the guess is determined by the status input signal 152. The scoring rule reward amount function U(G, B) is defined by:

$$U(G,B)=1-(G-B)^2.$$

For example, if the expert's belief is 80%, and the status input signal 152 confirms that a high impedance fault actually occurred, then the calculated score or reward amount is determined by the scoring rule portion 170 as:

$$U=[1-(1-0.80)^2]=0.96 \text{ (Example \#1; Correct);}$$

and if a high impedance fault did not occur, then the reward amount is determined by the scoring rule portion 170 as:

$$U=[1-(0-0.80)^2]=0.36 \text{ (Example \#2; Incorrect).}$$

This calibration process may be performed as a part of the acquaintance process when the expert detector is installed at a new site, it may be operator initiated, or it may periodically occur automatically. When the matrix portion 168 has collected a large number of confirmed events (columns "1, 2, 3, . . . , Final" in Table 3), for example, that collected over a several month time frame, a fairly accurate reward system score may be calculated by the scoring rule portion 170. The scoring rule portion 170 provides a reward amount U or score signal 172, preferably for each belief, to a score checking portion 174, labeled as "Is Score OK?" in FIG. 4.

If the score checking portion 174 determines that the calculated score U(B, G) is very close to, such as nearly 90% of the maximum score U(MAX), which is the score when all guesses are correct, a "yes" signal 176 is emitted by the score checking portion 174. When the "yes" signal 176 is emitted, the original belief for the technique is kept as valid and no change is made to the expert's belief in the technique being scored and checked.

If the score checking portion 174 determines that the calculated score U(G, B) does not fall within these selected limits, as indicated by a "no" signal 178, the belief, such as $B_1$ for technique 104, is changed by a new belief portion 180, labeled in FIG. 4 as, "Maximum Score: New Set of Beliefs." The new belief portion 180 calibrates the belief value, such as $B_1$ for the first technique 104, to a value which earns the highest calculated score for U using the performance history stored in Table 3. This new calibrated belief is supplied as the calibrated belief signal 162.

An example of the operation of the calibration process 160 for one of the detection techniques follows.

Referring to Table 4, a preferred manner of operating the score checking portion 174 and the new belief portion 180 is illustrated. Table 4 is a compilation of the data shown for a single technique in Table 3, for example, Technique 5. In this example, Technique 5 has a maximum of four status outputs ($X_M$=4) during the illustrated 30 second decision time window. A total of twenty performance history analysis time units are stored in the matrix portion 168, which corresponds to twenty columns in Table 3. Thus, twenty is also the sum of the total guesses $T_i$ in Table 4 ($\Sigma T_i$=6+8+4+1+1=20). The correct guesses $C_i$ correspond to the correct number of status outputs correctly indicating the occurrence of a fault 22 or correctly indicating that no fault occurred, and the incorrect guesses ($T_i$-$C_i$) correspond to the number of incorrect status outputs stored in the matrix portion 168 (Table 3).

TABLE 4

| | Belief Calibration for Technique 5 ($X_m$ = 4) | | | | |
|---|---|---|---|---|---|
| | Basic Belief B | | Adjusted Beliefs $B_A$ | | |
| Guesses | $(B_5)_0$ = 0.75 $X_A$ = 0 | $(B_5)_1$ = 0.75 $X_A$ = 1 | $(B_6)_2$ = 0.94 $X_A$ = 2 | $(B_5)_3$ = 0.98 $X_A$ = 3 | $(B_5)_4$ = 0.99 $X_A$ = 4 |
| Total ($T_i$) | 6 | 8 | 4 | 1 | 1 |
| Correct ($C_i$) | 4 | 3 | 1 | 0 | 0 |
| Incorrect ($T_i$-$C_i$) | 2 | 5 | 3 | 1 | 1 |

For example, for Event 1 in Table 3, Technique 5 provided one fault indication ($X_A$=1) which was confirmed as correctly indicating a fault occurred. This corresponds to one of the three correct guesses, and one of the eight total guesses, in the "$X_A$=1" column of Table 4. For Event 2 in Table 3, Technique 5 provided three incorrect fault indications ($X_A$=3) when no fault had occurred. This corresponds to the one incorrect guess, and the one total guess, in the "$X_A$=3" column of Table 4. For Event 3 in Table 3, Technique 5 provided two fault indications ($X_A$=2) which were confirmed as correctly indicating a fault occurred. This corresponds to the one correct guess, and one of the four total guesses in the "$X_A$=2" column of Table 4. For the "Final" event in Table 3, Technique 5 correctly provided zero fault indications ($X_A$=0). This corresponds to one of the four correct guesses, and one of the six total guesses, in the "$X_A$=0" column of Table 4.

The basic belief B shown in FIG. 3 is the same for zero or one fault indication. When a technique provides more than one fault indication, this basic belief is adjusted according to the actual number of fault indications $X_A$' and the elliptical relationship set out above, as shown by the adjusted belief B' in FIG. 3. These basic and adjusted belief values for Technique 5 are shown in Table 4, with the subscript numeral outside of the parenthesis indicating the number of actual fault indications. For instance, for two actual fault indications ($X_A$=2), the adjusted belief is $(B_5)_2$= 0.94.

The reward amount $U_5$ for Technique 5 is determined by the scoring rule portion 170, the score checking portion 174, or new belief portion 180 according to the following equation:

$$U_5 = \sum_{i=0}^{4} C_i\{1-(1-(B_5)_i)^2\} + \sum_{j=0}^{4} (T_j - C_j)\{1-(0-(B_5)_j)^2\}$$

The maximum possible score may be determined using this by solving the left portion for the total number ($T_i$) of guesses, that is, by assuming every guess is correct:

$$U_{5(MAX)}=(6)[1-(1-0.75)^2]+(8)[1-(1-0.75)^2]+(4)[1-(1-0.94)^2]+(1)[1(1-0.98^2]+(1)[1-(1-0.99)^2]=19.11$$

The initial reward amount $U_5$ with the current performance history and the basic and adjusted beliefs shown in Table 4 is calculated as $U_5$=11.25, which is less than 90% of the maximum value of $U_{5(MAX)}$(11.25 ÷19.11=65%) so the score checking portion 174 issues a "no" signal 178 to the new belief portion 180. The new belief portion 180 looks for a new belief value which maximizes the reward amount to a new reward value $U_5$'. For example, assume the most resent actual fault indications for Technique 5 during the current decision time window is zero ($X_{A5}$=0). The equation for U may be iterated by adjusting the belief value $(B_5)_0$ from 0.10 to 0.90 in 0.05 increments until the belief value corresponding to the maximum reward score is determined. The other values for the equation U remain as given in Table 4. In this manner, a new maximum reward value $U_5$' is found as 12.59 with a basic belief of $(B_5)_0$=0.45, which is provided by the calibrated beliefs signal 162 to the expert's belief portion 120. During the next decision time window where Technique 5 has zero fault indications ($X_{A5}$=0) as the status output, the newly calibrated belief of 0.45 is used by the belief adjustment portion 130 to weight this status output.

The initial reward amount $U_5$ for Technique 5 may be determined by the scoring rule portion 170, the score checking portion 174, or new belief portion 180. The maximum reward amount $U_{5(MAX)}$ may be determined by the score checking portion 174 or new belief portion 180. The new reward amount $U_5$' may be determined by the new belief portion 180, along with determining the new beliefs corresponding thereto. Thus, it is apparent that these functions, while separated for discussion into different component blocks in FIG. 4, may also be combined into one or more devices or routines. It is also apparent that the matrix of fault indications portion 168, the scoring rule portion 170, the score checking portion 174, and the new belief portion 180, may be implemented as hardware devices, software routines, or as combinations thereof, known to be structural equivalents by those skilled in the art. In the illustrated embodiment, the data of Tables 3 and 4, the scoring rule portion 170, the score checking portion 174, and the new belief portion 180 are implemented in software which may be stored in the RAM 52 or on the hard disk 54, or combinations thereof.

Implementation

The performance history of the detection techniques 104–110 is stored in Table 3 only for events (columns labeled "1, 2, 3, . . . Final") which have had the status of the feeder 12 actually confirmed by the input signal 152. Thus, the size of the permanently stored data is relatively small. Each column in Table 3 lists only the actual number of fault indications $X_A$ for each technique. The total number of status outputs, or the maximum number of fault indications $X_M$ is known for each technique for a decision time window of a selected duration (see Table 1). Usually, there is no confirmation input signal 152 available when the expert detector 10 indicates a "no fault" condition with the output status signal 146. Therefore, the columns of confirmed information shown in Table 3 are typically generated only when the expert detector 10 indicates the occurrence of a fault.

The number of events (columns of data) stored in Table 3 varies depending upon the particular implementation of the expert detector 10. During initial start-up, the calibration process 160 determines the initial performance of the expert detector with the initial beliefs using the scoring rule. If the score is not high enough, the calibration process 160 recalibrates the expert's belief portion 120. Belief calibration is performed successively for each of the detection techniques 104–110. Belief calibration assures the highest performance of high impedance fault detection by the expert detector 10. During operation, the calibration process 160 is not normally used. If the performance of the expert detector 10 is out of desired limits, the calibration process 160 may be included with the confirmed history data. This calibration using the scoring process automatically calibrates the expert's beliefs so that they are adaptive to changing situations.

Advantageously, the expert detector 10 improves its performance in both security and dependability with exposure to field data. Another important advantage of the expert detector 10 is its ability to accommodate new detection techniques as they are developed by experts in the art. The ability of the expert detector 10 to integrate a variety of techniques provides a more reliable system than those using only a single detection technique. Furthermore, the ability of the expert detection system 10 to integrate newly developed techniques with previous techniques provides a system capable of adapting to, and readily implementing, the latest developments in high impedance fault detection research.

Having illustrated and described the principles of my invention with respect to a preferred embodiment, it should be apparent to those skilled in the art that my invention may be modified in arrangement and detail without departing from such principles. For example, while the software implementation is illustrated and described, other devices known to be interchangeable by those skilled in the art may be substituted and suitably employed for the various component portions of the expert detector 10 described herein. I claim all such modifications falling within the scope and spirit of the following claims.

I claim:

1. A method of detecting high impedance faults occurring on a distribution circuit coupled to an AC power source, comprising the steps of:
   analyzing a parameter of power flowing over the distribution circuit using a set of fault detection techniques each providing a number of fault indications;
   weighting the number of fault indications from each fault detection technique, wherein the weighting step comprises
      weighting the number of fault indications from each fault detection technique according to an elliptical formula,
      initially assigning a weight to the number of fault indications from each fault detection technique, and
      adjusting the assigned weight of any fault detection technique having more than one fault indication; and
   combining the weighted number of fault indications from each fault detection technique to determine whether high impedance fault has occurred.

2. A method of detecting high impedance faults occurring on a distribution circuit coupled to an AC power source, comprising the steps of:
   analyzing a parameter of power flowing over the distribution circuit using a set of fault detection techniques each providing a number of fault indications;
   weighting the number of fault indications from each fault detection technique;
   combining the weighted number of fault indications from each fault detection technique to determine whether a high impedance fault has occurred;
   inputting a status input of the status of the distribution circuit;
   calibrating the weighting of at least one of the fault detection techniques to a performance history in response to the status input, wherein the calibrating step comprises the steps of:
      comparing the weighting of at least one of the fault detection techniques with the status input according to a scoring rule;
      awarding a score to at least one of the fault detection techniques in response to the comparing step; and
      changing the weighting of at least one of the fault detection techniques when the score indicates suboptimal performance; and
   repeating said analyzing step, said weighting step, and said combining step in response to said calibrating step.

3. A method of detecting high impedance faults according to claim 2, wherein the analyzing step comprises:
   analyzing the power parameter during a decision time period to produce an analysis unit of data representing the power parameter during the decision time period; and
   continually updating the analysis unit of data by replacing the oldest data with new data.

4. A method of detecting high impedance faults according to claim 2, wherein:
   the method further includes the step of monitoring a power flow parameter comprising a load current flowing through the distribution circuit; and
   the analyzing step comprises analyzing the monitored load current using at least one of the fault detection techniques.

5. A method of detecting high impedance faults according to claim 2, further including the step of deenergizing the distribution circuit when the occurrence of a high impedance fault is determined.

6. A method of detecting high impedance faults occurring on a distribution circuit coupled to an AC power source, comprising the steps of:
   analyzing a parameter of power flowing over the distribution circuit using a set of fault detection techniques each providing a number of fault indications;
   weighting the number of fault indications from each fault detection technique;
   combining the weighted number of fault indications from each fault detection technique to determine whether a high impedance fault has occurred; wherein
   the analyzing step comprises analyzing the load current during a decision time period to produce an analysis unit of data representing the load current during the decision time period, and continually updating the analysis unit of data by displacing the oldest data with new data;
   the weighting step comprises weighting the number of fault indications from each fault detection technique according to beliefs of an expert as to the accuracy of each technique by an elliptical formula; and
   the method further includes an initial start-up procedure comprising the steps of:
      providing a status input of the status of the distribution circuit; and
      calibrating the weighting of at least one of the fault detection techniques by comparing the weighting of at least one of the fault detection techniques with the status input according to a scoring rule, awarding a score to at least one of the fault detection techniques in response to the comparing step, and changing the weighting of at least one of the fault detection techniques when the score falls below a selected limit.

7. An expert system detection apparatus for detecting high impedance faults occurring on a distribution circuit coupled to an AC power source, comprising:
   a monitor for monitoring a parameter of power flowing over the distribution circuit and in response thereto, generating a load signal; and a controller responsive to the load signal for analyzing the power flow parameter over time with a set of fault detection techniques each providing distribution circuit status outputs including fault indications, the controller for weighting and combining the fault indications of each fault detection technique and determining therefrom whether a high impedance fault has occurred, wherein the controller includes a calibration device for receiving a status input of the status of the distribution circuit and for calibrating the weighting by the controller of at least one of the fault detection techniques in response to a performance history of at least one of the fault detection techniques.

8. An expert detection apparatus according to claim 7 wherein the monitor comprises a load current monitoring device and the monitored power flow parameter comprises a load current flowing over the distribution circuit.

9. An expert detection apparatus according to claim 7 further including a circuit breaker interface device for deenergizing the distribution circuit when the occurrence of a high impedance fault is determined.

10. An expert system detection apparatus for detecting high impedance faults occurring on a distribution circuit coupled to an AC power source, comprising a controller responsive to at least one parameter of power flowing over the distribution circuit, the controller having a set of fault detection portions for analyzing the distribution circuit status and providing a number of status outputs, the controller also having a weighting portion for weighting the status outputs, and a combination portion for combining the weighted status outputs to determine whether a high impedance fault has occurred, wherein the controller comprises an adaptive controller including a calibration portion for comparing the combined weighted status outputs with an input of the status of the distribution circuit, and in response thereto, for changing the weighting of the status outputs when a variation between a combined performance history of the status outputs and the status input exceeds a selected limit.

11. An expert detection apparatus according to claim 10 wherein the controller comprises an interface for providing a trip signal to a circuit breaker mechanism for deenergizing the distribution circuit in response to the trip signal when the occurrence of a high impedance fault is determined.

12. A method of detecting high impedance faults occurring on a distribution circuit coupled to an AC power source, comprising the steps of:

analyzing a load current flowing over the distribution circuit for an occurrence of a high impedance fault using a set of fault detection techniques, and over a decision time period each fault detection technique providing a number of status outputs indicating normal and fault conditions on the distribution circuit;

assigning a weight to the status outputs of each fault detection technique;

when more than one of the status outputs of a fault detection technique indicate the occurrence of a fault, adjusting the assigned weight for the status outputs of said fault detection technique, wherein the adjusting step comprises adjusting the assigned weight of said fault detection technique in response to a weight previously assigned, and in response to the number of fault indications and the maximum number of possible fault indications for said fault detection technique during a predetermined time period; and combining the assigned weight of the status outputs of each fault detection technique to determine whether a high impedance fault has occurred.

13. A method of detecting high impedance faults according to claim 12 further including the steps of:

inputting a status of the distribution circuit; and calibrating the assigned weight to a new weight in response to the status input and a performance history of said technique.

14. A method of detecting high impedance faults according to claim 12 wherein:

the adjusting step comprises adjusting the assigned weight according to an elliptical relationship between a weight previously assigned, and the number of fault indications and the total number of status outputs for said fault detection technique;

the method further includes the steps of:

inputting a status of the distribution circuit;

calibrating the assigned weight to a new weight in response to the status input and a performance history of said fault detection technique; and deenergizing the distribution circuit when the occurrence of a high impedance fault is determined.

15. A method of detecting high impedance faults according to claim 12, wherein the fault detection technique further comprises the step of:

providing directly or indirectly an execution time to produce the status indications.

16. A method of detecting high impedance faults on a power distribution system, said method comprising the steps of:

analyzing a parameter of power flowing over said power distribution system using a set of power flow fault detection techniques, each of said power flow fault detection techniques providing a fault indication, said set of power flow fault detection techniques producing a plurality of fault indications;

calibrating the weighting of at least one of said power flow fault detection techniques, said calibrating step including the steps of comparing the weighting of a selected power flow fault detection technique with a status input according to a scoring rule, awarding a score to said selected power flow fault detection technique in response to said comparing step, and changing the weighting of said selected power flow fault detection technique when said score falls below a selected limit;

weighting each of said plurality of fault indications in accordance with a human expert's belief as to the accuracy of each fault detection technique to produce a plurality of weighted fault indications; and combining said plurality of weighted fault indications into a combined signal indicative of whether a high impedance fault has occurred.

17. The method of claim 16 wherein the weighting step includes the step of weighting said plurality of fault indications according to an elliptical formula.

18. The method of claim 16 wherein said analyzing step includes the step of monitoring a load current in said power distribution system.

19. The method of claim 16 further comprising the step of providing, in response to said combined signal, status indications for normal or fault conditions on said power distribution system.

20. The method of claim 19 further comprising the step of de-energizing a portion of said power distribution system in response to fault conditions.

* * * * *